United States Patent
Brosnan et al.

(10) Patent No.: US 7,434,663 B1
(45) Date of Patent: Oct. 14, 2008

(54) RETAIL CHECKOUT STATION INCLUDING A PLURALITY OF SELECTIVELY DEPLOYABLE BARRIERS FOR INTRA-ORDER SEPARATION OF PURCHASED ITEMS

(75) Inventors: Susan W. Brosnan, Raleigh, NC (US); Rosemarie J. DiGeorgio, Raleigh, NC (US); Sheryl A. Paradise, Raleigh, NC (US); Devin S. Sanders, Durham, NC (US); Deborah M. Vertefeuille, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/017,143

(22) Filed: Jan. 21, 2008

(51) Int. Cl.
*B65G 47/26* (2006.01)
(52) U.S. Cl. .................... 186/68; 198/459.6
(58) Field of Classification Search ............ 186/59, 186/60, 68, 69; 198/459.6, 459.7, 460.1, 198/419.3
See application file for complete search history.

(56) References Cited

U.S. PATENT DOCUMENTS 2,564,642 A * 8/1951 Edwards ............... 186/59
3,678,660 A 7/1972 Musser
4,261,456 A * 4/1981 Scarpa et al. ............ 198/460.1
4,792,018 A 12/1988 Humble et al.
5,311,969 A 5/1994 Dickover et al.
5,515,944 A 5/1996 Cappi et al.
2006/0038007 A1 2/2006 Dickover et al.
2007/0051561 A1 3/2007 Harris et al.

FOREIGN PATENT DOCUMENTS

WO WO 2005/104913 A1 11/2005

* cited by examiner

*Primary Examiner*—Patrick Mackey
*Assistant Examiner*—Mark Beauchaine
(74) *Attorney, Agent, or Firm*—Cantor Colburn LLP; Jason O. Piche

(57) ABSTRACT

A retail checkout station includes a product scanning portion and a product support member. A bagging portion is arranged at a second end portion of the product support member. The bagging portion includes a first end, a second end and an intermediate zone for supporting articles scanned at the product scanning portion. A product transport is provided on the intermediate portion of the product support member. The product transport includes a transport assembly having a first end section extending from a position adjacent the product scanning portion to a second end section that terminates adjacent the first end of the bagging portion. A plurality of barrier members are arranged between the second end section of the transport assembly and the second end of the bagging portion. The plurality of barrier members are selectively deployable to serve as an intra-order separator that shields at least one product resting in the bagging portion from other products.

3 Claims, 3 Drawing Sheets

RETAIL CHECKOUT STATION INCLUDING A PLURALITY OF SELECTIVELY DEPLOYABLE BARRIERS FOR INTRA-ORDER SEPARATION OF PURCHASED ITEMS

BACKGROUND OF THE INVENTION

Field of the Invention

This invention relates to the art of retail checkout systems and, more particularly, to a retail check out system having a selectively deployable barrier configured to protect fragile articles from being damaged during a checkout process.

While shopping, retail customers add items to a shopping cart in no particular order. That is, most shoppers do not have the time or inclination to stage or set up their shopping cart in a particular order with a mind on final check out. At checkout it is desirable to stage a shopping cart such that all heavy items are scanned before light and crushable items. However, it is more likely that light and crushable items are placed on top of heavy items to avoid their being damaged during shopping. Thus, at check out, the light and crushable items are scanned first followed by the heavy items. In this manner, the heavy items are transported down a conveyor belt and brought to rest against the light and crushable items. With the heavy items piling up against the light and crushable items damage often occurs. Requiring a shopper to run and bag all light and crushable items before initiating a scan of the heavy items will decrease both throughput and customer satisfaction. Add additional customer distractions such as children, impulse items, other customers and inexperience, and the shopper is even more likely to end up with flattened bread and cracked eggs.

SUMMARY OF THE INVENTION

The shortcomings of the prior art are overcome and additional advantages are provided through the provision of a retail checkout station constructed in accordance with an exemplary embodiment of the present invention. The retail checkout station includes a product scanning portion having a scanning device for scanning products purchased by a consumer, a user interface portion including keypad and a display, and a product support member. The product support member includes a first end portion arranged adjacent to the product scanning portion, a second end portion and an intermediate portion. A bagging portion is arranged at the second end portion of the product support member. The bagging portion includes a first end, a second end and an intermediate zone for supporting articles scanned at the product scanning portion. A product transport is provided on the intermediate portion of the product support member. The product transport includes a transport assembly having a first end section extending from a position adjacent the product scanning portion to a second end section that terminates adjacent the first end of the bagging portion. The retail checkout station also includes a plurality of barrier members arranged between the second end section of the transport assembly and the second end of the bagging portion. Each of the plurality of barrier members is selectively deployable to serve as an intra-order separator that shields at least one product resting in the bagging portion from other products moving toward the bagging portion on the transport assembly.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
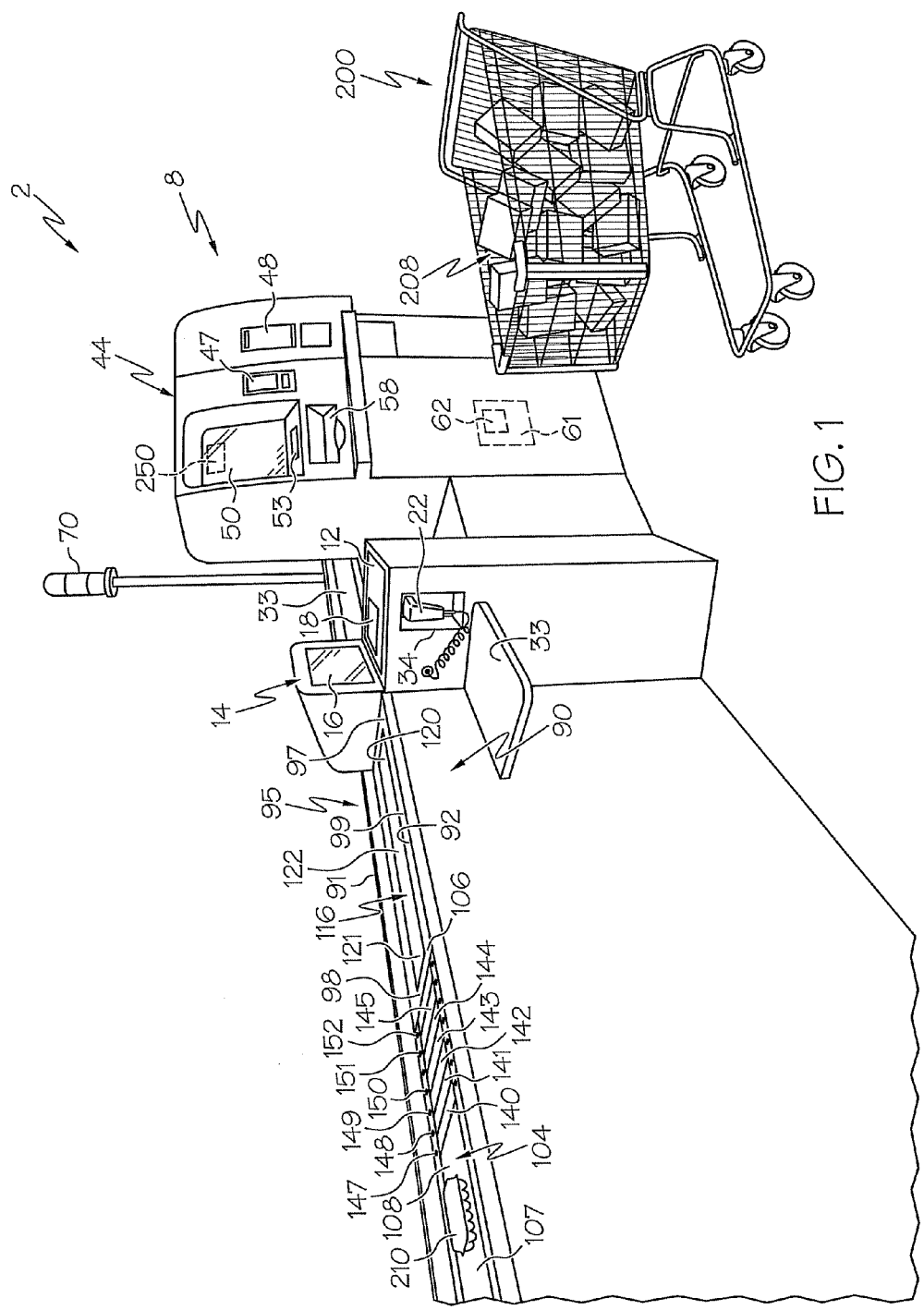
FIG. 1 is a left perspective view of a retail checkout system having a plurality of barrier members constructed in accordance with an exemplary embodiment of the present invention, and shown with the plurality of barrier members in an undeployed configuration.
Figure 2:
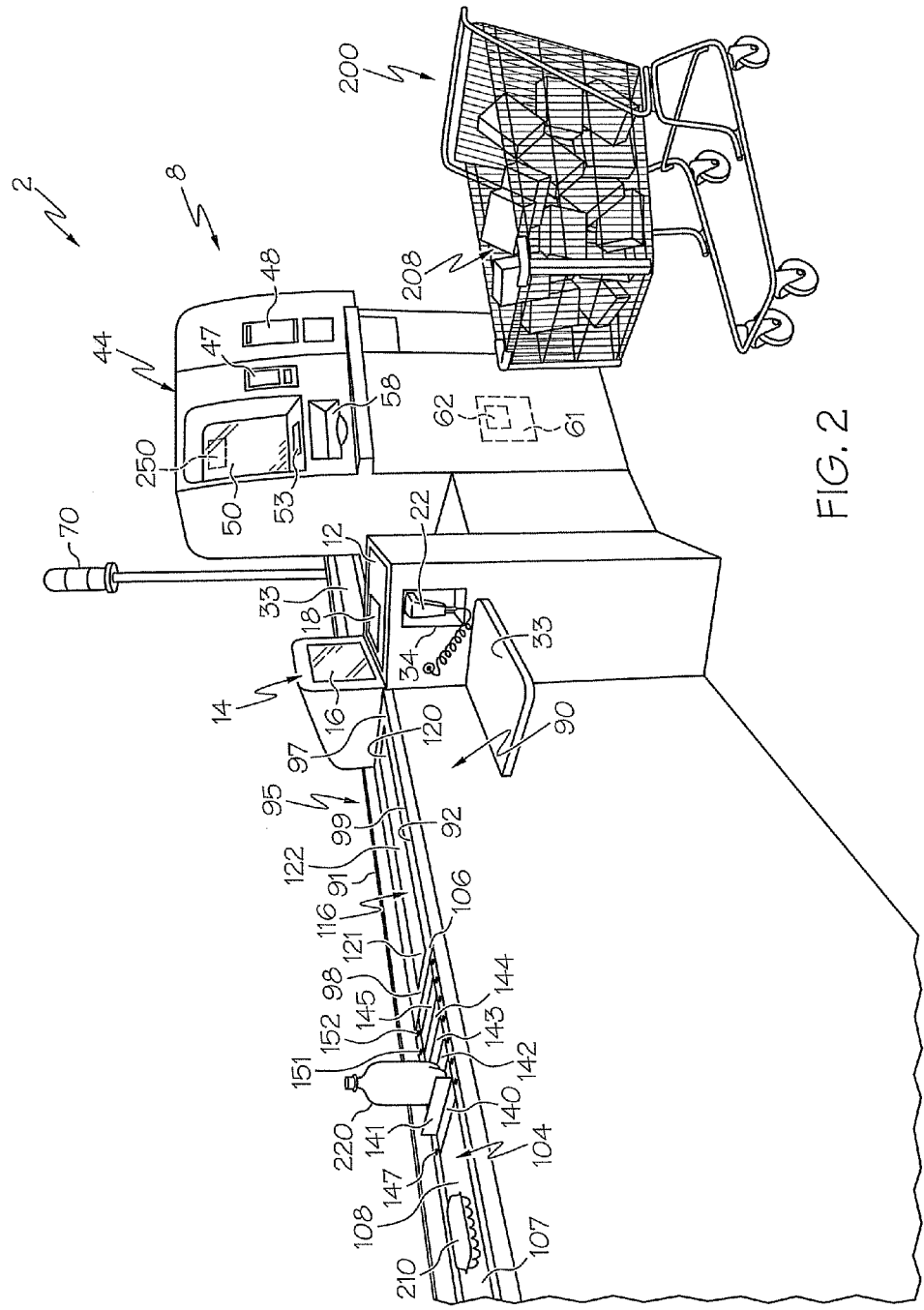
FIG. 2 is a left perspective view of the retail checkout system of FIG. 1 shown with select ones of the plurality of barrier members in a deployed configuration.

With initial reference to FIGS. 1 and 2, a retail checkout station constructed in accordance with an exemplary embodiment of the present invention is indicated generally at 2. Checkout station 2 includes a product scanning portion 5 and a user interface portion 8. Product scanning portion 5 includes a product scale 12, a stationary scanner 14 having a vertical scanning surface 16 and a horizontal scanning surface 18, and a hand-held scanner 22. Stationary scanner 14 and hand-held scanner 22 scan or read product identification codes, such as Universal Product Code (UPC), industrial symbol(s), alpha-numeric character(s) or other indicia associated with items to be purchased. Scanner portion 5 is further shown to include a housing 30 having a counter surface 33, and a holder 34 that serves as a housing for hand-held scanner 22.

User interface portion 8 includes a housing 44 having a card reader 47, a bill acceptor/validator 48, a display monitor 50, a keypad 53, a receipt printer 55 for printing receipts, and a change well 58 for selectively returning change to customers upon completion of a purchase transaction. User interface 8 further includes a computer 61 including a CPU 62. Checkout station 2 is also shown to include a status light 70 that signals customers that terminal 2 is open or store personnel that help is required.

As further shown in FIGS. 1 and 2, checkout station 2 includes a product support member 90 having first and second raised wall members 91 and 92 that define a product support/ transport zone 95. Product support/transport zone 95 includes a first end portion 97, positioned adjacent product scanning portion 5 that extends to a second end portion 98 through an intermediate portion 99. Checkout station 2 is further shown to include a bagging portion 104 that abuts product support/ transport zone 95. Bagging portion 104 includes a first end 106 that ends from second end portion 98 of product support/ transport zone 95 to a second end 107 through an intermediate zone 108. A product transport assembly or conveyor 116 carries purchased items from scanning portion 5 to bagging portion 104. Towards that end, conveyor 116 is positioned on product support/transport zone 95. Conveyor 116 includes a first end section 120 that extends to a second end section 121 through an intermediate section 122. As shown, first end section 120 is positioned adjacent scanning portion 5 while second end second 121 terminates at first end 106 of bagging portion 104.

In accordance with the exemplary embodiment shown, checkout terminal 2 includes a plurality of selectively deployable barriers 140-145 positioned between first and second ends 106 and 107 of bagging portion 104. Each barrier 140-145 includes a corresponding sensor element 147-152 positioned upon first side wall member 91. As will become more fully evident below, sensor elements 147-152 detect a position of items in bagging portion 104 relative to barriers 140-145. In this manner, a select one(s) of barriers 140-145 is deployed in order to shield one or more food items on bagging portion 104 from other food items moving along conveyor 116.

During a transaction, a customer approaches checkout station 2 with a shopping cart, such as indicated at 200, full of various items/products indicated generally at 208. During the transaction, the customer scans each of items 200 through stationary scanner 14. Conventionally, products scanned at a first portion of the transaction are lightweight, crushable and or delicate items, for example, a carton of eggs 210 that are placed on top of larger/heavier items in cart 200. Once the light weight and/or crushable items are scanned and resting in bagging portion 104, the customer scans larger/heavier items, for example, bottles of soda, canned goods, meat and the like such as indicated at 220 in FIG. 2. In order to prevent the lightweight item from being damaged by the heavier item, one of the plurality of barrier members is deployed. More specifically, computer 61 receives signals from sensors 147-152 regarding a location of food item 210 relative to barriers 140-145. At this point, a select one of barriers 140-145 is extended vertically upward to shield food item 210. In the present case, barrier 142 is closest to food item 210 and is thus deployed as a shield. If sensor 149 detected that barrier 142 was blocked by a food item, the next barrier, i.e., barrier 143 would be deployed.

In accordance with one aspect of the invention, user interface portion 8 includes a selector member 250 provided on display 50. Selector member 250 is shown as a graphical user interface or GUI element on display 50, however it should be understood that selector member 250 could also be a hardware button provided on user interface 8. With this arrangement, a select one(s) of barriers 140-145 is deployed upon the customer activating selector member 250. Of course it should be understood that the particular location of selector member 250 can vary.

Figure 3:
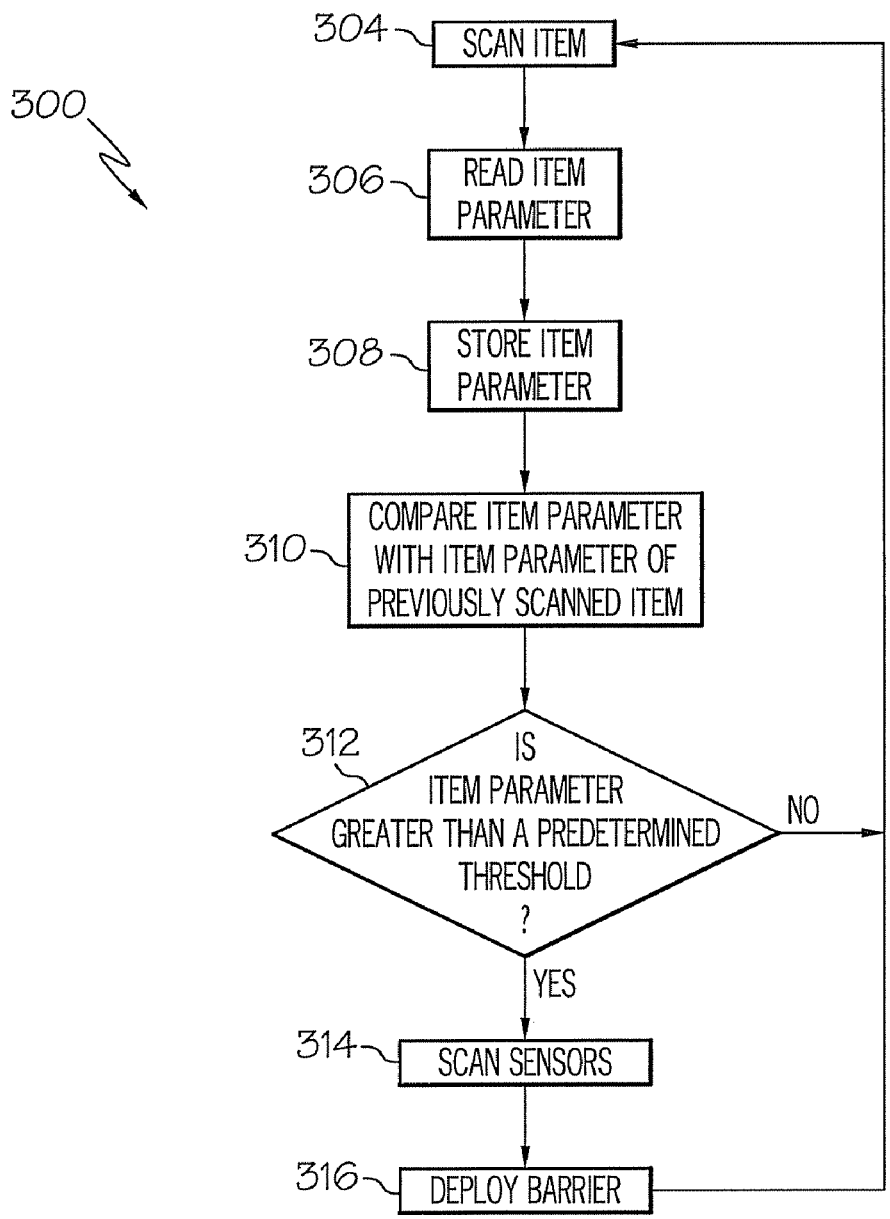
FIG. 3 is a flow diagram illustrating a method of selectively deploying barriers at a retail checkout station to facilitate intra-order separation in accordance with an exemplary embodiment of the present invention.

FIG. 3 illustrates a method 300 of automatically selectively deploying barriers 140-145 in accordance with an exemplary embodiment of the present invention. As each product is scanned, as illustrated in block 302, a product or item parameter is identified in block 304. The item parameter can be a weight parameter determined at product scale 12, or a preconfigured list of items stored in a memory (not shown) of computer 61. In any event, the item parameter is stored in the memory in computer 61 in block 308 and compared to an item parameter of a previously scanned item in block 310. If the item parameter is greater than a predetermined threshold, as determined in block 312, sensors 147-152 are scanned to determine which of barriers 140-145 should be deployed in block 314, a select one of barriers 140-145 is deployed in block 316 and the process returns to block 304. If the item parameter is less than the predetermined threshold, the process returned to block 304 and the next item is scanned.

At this point, it should be appreciated that the present invention provides an intra-order separation of items at a retail checkout station. In this manner, if a heavy item is sent down conveyor 116 after a light or crushable item, a select one of barriers 140-145 is deployed to serves as a shield to protect the light/crushable item. In this manner, customers can stand at one location and scan all products to be purchased without having to dash down and bag lightweight/crushable items before scanning larger items. In addition, customers are saved the time and effort involved with staging or setting up a shopping cart such that lightweight/crushable items are conveniently arranged to be scanned after the heavier items. It should be further understood that while described in connection with food items, exemplary embodiments of the present invention can be employed in a wide range of retail locations. Finally, it should be appreciated that the flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A retail checkout terminal comprising:
 a product scanning portion including a scanning device for scanning products purchased by a consumer;
 a user interface portion including keypad and a display;
 a product support member having a first end portion arranged adjacent to the product scanning portion, a second end portion and an intermediate portion;
 a bagging portion arranged at the second end portion of the product support member, the bagging portion including a first end, a second end and an intermediate zone for supporting articles scanned at the product scanning portion;

a product transport assembly provided on the product support member, the product transport assembly including a first end section extending from a position adjacent the product scanning portion to a second end section that terminates adjacent the first end of the bagging portion;

a plurality of barrier members arranged between the second end section of the transport assembly and the second end of the bagging portion, each of the plurality of barrier members being selectively deployable to serve as an intra-order separator that shields at least one product resting in the bagging portion from other products moving toward the bagging portion on the product transport assembly;

a plurality of sensors, each of the plurality of sensors being arranged adjacent a corresponding one of the plurality of barrier members, wherein the plurality of sensors determine a position of the at least one product in the bagging portion relative to the plurality of barrier members; and a selector element provided on the user interface, the selector element being activated to deploy a select one of the plurality of barrier members based upon the position of the at least one product in the bagging portion.

2. The retail checkout terminal according to claim 1, wherein each of the plurality of barrier members are selectively vertically deployable to shield at least one product resting in the bagging portion from other products moving toward the bagging portion on the transport assembly.

3. The retail checkout terminal according to claim 1, wherein each of the plurality of barrier members is automatically selectively deployable.

* * * * *